2,876,100

METHOD OF PREPARING A MEAT PRODUCT

Alan Barde Rogers, Palos Park, and Thomas C. Gordon, Jr., Wilmette, Ill., assignors to Armour and Company, Chicago, Ill., a corporation of Illinois No Drawing. Application March 8, 1956
Serial No. 570,391

3 Claims. (Cl. 99—107)

This invention relates to a meat product and its method of preparation. More particularly, the invention relates to an encased loaf or log containing meat such as turkey or chicken in association with bread stuffing.

While it is to be understood that the present invention is applicable to any kind of meat, including the meat of animals or fowl, for the purposes of the present specification the invention will be described as applied to boned turkey.

In recent years, the turkey industry has initiated the practice of marketing a portion of its turkeys in the form of boned turkey meat in a convenient loaf or log form. The usual method of producing such a product involves removing the skin from the fresh dressed turkey in a single piece; then removing the meat from the bones in as large pieces as practical; assembling the pieces of boned meat in substantially the same proportions of light and dark meat as occur in the turkey; and then wrapping the resulting turkey loaf or log under pressure within a regular film or casing. The resulting product is usually cooked and then frozen before distribution to the trade. The final product, which may contain all the meat of one or more turkeys, has the advantage of reducing storage and freezer space, eliminating the use of the kitchen utensils ordinarily required in the dressing and carving of turkey, and providing efficient portion control of the served meat, which is of particular importance in restaurants and other institutional operations It is an object of the present invention to provide an improvement in the above described type of product. More particularly, it is an object of the invention to provide a meat product in loaf or log form within a casing, which product, even after cooking, retains all the natural juices and flavors originally present in the turkey meat and also retains the tight and uniform shape of the uncooked loaf. Other objects and advantages of the invention will appear as the specification proceeds.

The present invention is based in part on the observation that a turkey loaf or log enclosed within a casing will, upon cooking, shrink to a considerable degree in a longitudinal direction but only to a very limited degree cross-sectionally. Thus, in the case of a pressure-packed turkey log having the meat pieces arranged within the log in the usual manner, it has been found that the product in cooking usually shrinks so that a vacant space several inches in length is left at each end of the log within the casing, whereas the cross-sectional shrinkage is hardly noticeable. Moreover, the cooking process extracts a good deal of juice from the meat, which juice collects within the casing at the vacant spaces adjacent each end of the log. This leaves the producer with the alternatives of either (1) marketing an unattractive product comprising a loosely wrapped log having free juices visible within the casing, or (2) puncturing the casing to draw off the juices and then attempting to rework the excessive casing film into a tightly wrapped package. In the latter case, the nutritional value of the juices which are drawn off is lost as far as the particular log or loaf is concerned.

The product of the present invention comprises an encased loaf or log such as described above but having a section of bread stuffing in contact and in open communication with the meat component of the product. It has been found that when the meat is arranged as a center section with a section of bread stuffing placed at one or both ends, or when the bread stuffing is arranged as a center section with a section of meat at one or both ends, and the product then pressure packed within a casing and cooked, the cooking operation causes the usual shrinkage of the meat in a longitudinal direction, but at the same time the juices which are cooked out of the meat pass into and are taken up by the bread stuffing, thus causing the stuffing to swell and fill the void left by the shrinkage of the meat. This compensating effect of the swelling of the stuffing upon the shrinkage of the meat results in a combination loaf or log which, even after cooking, retains not only the same tight and uniform shape but also all of the nutritional and flavorful juices of the original meat. The resulting product has a substantially improved consumer acceptance, since the loaf is firmly and uniformly packed, without any free juices visible within the wrapper, although all the original juices have been retained in the product.

The bread stuffing to be used in the practice of this invention is not limited to any specific type and may be any of the forms of bread stuffing ordinarily employed in connection with the cooking of meats. For example, a stuffing including bread, celery, onions, shortening, salt, and spices has been found most suitable for the purposes of this invention. The stuffing may be prepared starting with the above types of ingredients or may be purchased as a commercially prepared stuffing of the type offered by several large baking companies. In the practice of the invention, it is important to add the stuffing at the ends of the meat log in a dry or partially hydrated condition, so that the stuffing will have a capacity for absorption of the juices as they are cooked out of the meat. In practice it has been found preferable to employ the partially hydrated form, since under most conditions insufficient juice is cooked out of the meat to impart the desired degree of moistness to a completely dry stuffing.

The following is a specific example illustrating the preparation of a meat product embodying the present invention:

EXAMPLE

Skinning

The turkey is hung by the wings. Cuts are made through the skin starting at the neck opening, down the back and around the tail. The second cut is across the back from wing to wing and around each wing. The skin is removed in one piece by skinning over the back and thighs, off the breast, and then pulling off the legs.

Boning

The legs and thigh pieces are removed in one piece. Each half breast is then removed including as much flesh from the base of the wings and near the wishbone as possible. The legs and thighs are boned and the tendons removed. Small pieces of both light and dark meat are trimmed from the carcass. Finally the wings are removed.

Preparing the loaf

An appropriate piece of skin is spread out on a table, and suitable portions of light and dark meat arranged upon the skin. About half the skin is used for an 8 pound roll starting with a 20–22 pound turkey. The proportions of meat comprise approximately 60% light and 40% dark meat. A mixture of gelatin, salt, pepper, and monosodium glutamate is then sprinkled over the meat. Following this, a section of bread stuffing mix is pressed into the meat at each end of the roll. The stuffing mix contains dried bread, spices, and flavorings and is partially hydrated with water. The roll is then loosely formed by pulling the edges and ends of the skin around the product and securing it by tying with string. Next, the roll is pressed into a fibrous casing and the casing stretched tight with a pressure packing machine, the ends of the casing being secured by metal clips. After the casing has been closed, the product is processed in water at about 195° F. in order to thoroughly cook the meat. During the cooking process, moisture, fat, and flavors cooked out of the meat and penetrate the partially hydrated stuffing to give it sufficient moisture and flavor. At the same time, the stuffing swells upon taking up the moisture and thus compensates for the shrinking of the meat, so that the cooked product retains its original tightly packed shape. Following the cooking operation, the product is frozen and is merchandised in the frozen state.

While in the foregoing specification various embodiments of this invention have been set forth and specific details thereof elaborated for purposes of illustration, it will be apparent to those skilled in the art that this invention is susceptible to other embodiments and that many of the details may be varied widely without departing from the basic concept and spirit of the invention.

We claim:

1. A process for the preparation of a food product comprising the steps of forming meat pieces in a loaf form, enclosing said loaf within a substantially water-impervious casing with sections of dry bread stuffing contacting the ends of said loaf, and subsequently cooking said product.

2. A process for the preparation of a food product comprising the steps of forming meat pieces in a loaf form, enclosing said loaf within a substantially water-impervious casing with sections of partially hydrated bread stuffing contacting the ends of said loaf, and subsequently cooking said product.

3. The process of claim 2 in which said meat pieces are turkey pieces.

References Cited in the file of this patent

UNITED STATES PATENTS

| | | |
|---|---|---|
| 2,518,406 | Weber | Aug. 8, 1950 |
| 2,633,601 | Snyder | Apr. 7, 1953 |
| 2,640,779 | George | June 2, 1953 |
| 2,644,358 | Eichler | Dec. 29, 1953 |

OTHER REFERENCES

"Culinary Arts Institute Encyclopedic Cook Book," 1948, by Ruth Berolzheimer, published by Culinary Arts Institute, Chicago, pp. 444 and 445.

"Modern Encyclopedia of Cooking," 1949, vol. II, by Meta Given, published by J. G. Ferguson and Associates, Chicago, pp. 1218 and 1219.